US012568545B2

(12) United States Patent
Cheong et al.

(10) Patent No.: US 12,568,545 B2
(45) Date of Patent: Mar. 3, 2026

(54) ULTRA-WIDEBAND COMMUNICATION METHOD BASED ON BLUETOOTH COMMUNICATION QUALITY SHARING AND ELECTRONIC DEVICE THEREFOR

(71) Applicant: Samsung Electronics Co., Ltd., Suwon-si (KR)

(72) Inventors: Gupil Cheong, Suwon-si (KR); Moonseok Kang, Suwon-si (KR); Doosuk Kang, Suwon-si (KR); Bokun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 314 days.

(21) Appl. No.: 18/474,761

(22) Filed: Sep. 26, 2023

(65) Prior Publication Data

US 2024/0032123 A1 Jan. 25, 2024

Related U.S. Application Data

(63) Continuation of application No. PCT/KR2022/004843, filed on Apr. 5, 2022.

(30) Foreign Application Priority Data

Apr. 9, 2021 (KR) ........................ 10-2021-0046394

(51) Int. Cl.
| | |
|---|---|
| *H04W 76/15* | (2018.01) |
| *H04W 48/10* | (2009.01) |
| *H04W 72/542* | (2023.01) |

(52) U.S. Cl.
CPC ........... *H04W 76/15* (2018.02); *H04W 48/10* (2013.01); *H04W 72/542* (2023.01)

(58) Field of Classification Search
CPC ............................ H04W 76/15; H04W 72/542
See application file for complete search history.

(56) References Cited

U.S. PATENT DOCUMENTS

| | | | |
|---|---|---|---|
| 7,747,223 | B2 | 6/2010 | Wilson et al. |
| 8,364,088 | B2 | 1/2013 | Pattenden et al. |

(Continued)

FOREIGN PATENT DOCUMENTS

| | | |
|---|---|---|
| CN | 105554791 | 5/2016 |
| CN | 110972063 | 4/2020 |

(Continued)

OTHER PUBLICATIONS

International Search Report for PCT/KR2022/004843 mailed Jul. 26, 2022, 2 pages.

(Continued)

*Primary Examiner* — Parth Patel
(74) *Attorney, Agent, or Firm* — Nixon & Vanderhye, P.C.

(57) ABSTRACT

Disclosed is an electronic device comprising: a first communication circuit configured to support communication according to a Bluetooth protocol; a second communication circuit configured to support communication according to an ultra-wideband (UWB) protocol; a processor; and a memory. The electronic device can be configured to: receive a first signal from a second external electronic device; transmit, to at least one first external electronic device, first quality information related to communication with the second external electronic device; receive, from the at least one first external electronic device, second quality information related to communication between the at least one first external electronic device and the second external electronic device; and, based on the first quality information and the second quality information, determine, from among the electronic device and the at least one first external electronic (Continued)

device, a device to communicate with the second external electronic device on the basis of the UWB protocol.

20 Claims, 10 Drawing Sheets

(56)                 References Cited

U.S. PATENT DOCUMENTS

| 9,769,686 | B2 | 9/2017 | Kang et al. |
| 10,212,545 | B2 | 2/2019 | Choi et al. |
| 10,223,853 | B1 | 3/2019 | Okada |
| 10,395,460 | B2 | 8/2019 | Okada |
| 10,486,646 | B2 | 11/2019 | Ledvina et al. |
| 10,652,925 | B2 | 5/2020 | Naguib et al. |
| 10,759,389 | B2 | 9/2020 | Ledvina et al. |
| 10,930,133 | B1 | 2/2021 | Chen |
| 11,019,195 | B2 | 5/2021 | Ledvina et al. |
| 11,166,140 | B2 | 11/2021 | Cheong et al. |
| 11,272,556 | B2 | 3/2022 | Hariharan et al. |
| 11,435,462 | B2 | 9/2022 | Hong et al. |
| 11,502,786 | B2 | 11/2022 | Jang et al. |
| 11,516,337 | B2 | 11/2022 | Ledvina et al. |
| 11,671,530 | B2 | 6/2023 | Ledvina et al. |
| 11,671,804 | B2 | 6/2023 | Cheong et al. |
| 12,356,368 | B2 * | 7/2025 | Kim ........................ G01S 13/08 |
| 2008/0242220 | A1 | 10/2008 | Wilson et al. |
| 2010/0125680 | A1 * | 5/2010 | Kim ...................... H04W 8/005 |
| | | | 710/11 |
| 2010/0255787 | A1 | 10/2010 | Wilson et al. |
| 2012/0124400 | A1 * | 5/2012 | Yoon ................. H04W 52/0209 |
| | | | 713/310 |
| 2014/0342670 | A1 | 11/2014 | Kang et al. |
| 2015/0319630 | A1 * | 11/2015 | Åkerberg ............ H04W 72/542 |
| | | | 370/252 |
| 2017/0083345 | A1 * | 3/2017 | Sol ........................ H04W 12/08 |
| 2018/0099643 | A1 * | 4/2018 | Golsch ................. G01S 13/765 |
| 2019/0137613 | A1 * | 5/2019 | Yan ......................... G01S 13/08 |
| 2019/0156606 | A1 | 5/2019 | Okada |
| 2020/0062217 | A1 | 2/2020 | Ledvina et al. |
| 2020/0082370 | A1 | 3/2020 | Yang et al. |
| 2020/0100283 | A1 | 3/2020 | Naguib et al. |
| 2020/0275369 | A1 * | 8/2020 | Foster ................. H04W 52/267 |
| 2020/0288292 | A1 | 9/2020 | Cheong et al. |
| 2020/0380178 | A1 * | 12/2020 | Santarone ................. G01S 3/48 |
| 2021/0076434 | A1 | 3/2021 | Hariharan et al. |
| 2022/0053310 | A1 | 2/2022 | Cheong et al. |
| 2022/0149890 | A1 | 5/2022 | Hariharan et al. |
| 2023/0051718 | A1 | 2/2023 | Ledvina et al. |
| 2023/0103620 | A1 * | 4/2023 | Hasegawa ............ G01S 5/0284 |
| | | | 455/456.1 |
| 2024/0032123 | A1 * | 1/2024 | Cheong ................. H04W 48/10 |

FOREIGN PATENT DOCUMENTS

| CN | 112433201 | A | 3/2021 |
| KR | 20090132636 | A | 12/2009 |
| KR | 20140078992 | A | 6/2014 |
| KR | 20140135569 | A | 11/2014 |
| KR | 20160020825 | A | 2/2016 |
| KR | 20200106742 | A | 9/2020 |
| KR | 10-2021-0002822 | | 1/2021 |
| KR | 20210020541 | A | 2/2021 |
| KR | 20210020648 | A | 2/2021 |
| WO | 2020069311 | A1 | 4/2020 |

OTHER PUBLICATIONS

Written Opinion of the ISA for PCT/KR2022/004843 mailed Jul. 26, 2022, 3 pages.
Extended European Search Report dated Jul. 12, 2024 issued in European Patent Application No. 22784903.1.
Korean Notice of Allowance issued Dec. 1, 2025 in corresponding Korean Patent Application No. 10-2021-0046394.

* cited by examiner

100

ULTRA-WIDEBAND COMMUNICATION METHOD BASED ON BLUETOOTH COMMUNICATION QUALITY SHARING AND ELECTRONIC DEVICE THEREFOR

CROSS-REFERENCE TO RELATED APPLICATIONS

This application is a continuation of International Application No. PCT/KR2022/004843 designating the United States, filed on Apr. 5, 2022, in the Korean Intellectual Property Receiving Office and claiming priority to Korean Patent Application No. 10-2021-0046394, filed on Apr. 9, 2021, in the Korean Intellectual Property Office, the disclosures of each of which are incorporated by reference herein in their entireties.

BACKGROUND

Field

The disclosure relates to an ultra-wideband (UWB) communication method based on Bluetooth communication quality sharing and an electronic device therefor.

Description of Related Art

In positioning systems in the related art, positioning systems based on satellite signals are widely used. However, in the case of positioning based on satellite signals, it is difficult to perform positioning indoors and there is a disadvantage in that accuracy is low. In particular, for applications operating based on the distance between two electronic devices, high accuracy is required. For example, for an application supporting keyless entry, user access may be allowed only when the user is positioned within a specific distance.

For more accurate distance measurement and higher data throughput, ultra-wideband (UWB) communication may be used. In UWB communication, an electronic device may communicate with another electronic device using pulse signals having a wideband frequency of 500 MHz or higher. Due to the wideband characteristics, the electronic device is able to identify a distance to other electronic devices with high accuracy. Since wideband frequencies are used in UWB communication, UWB communication may provide a more robust solution to path delays such as multi-path. In addition, UWB communication may minimize interference with other wireless protocols using pulse signals.

Mobile electronic devices, such as cell phones, may have a limited amount of available power. Accordingly, when a UWB communication module for the UWB communication is continuously activated, battery consumption of an electronic device may increase. In order to reduce power consumption of the electronic device, activation of UWB communication based on Bluetooth (e.g., Bluetooth low energy, BLE) communication having relatively low power consumption may be performed. For example, the electronic device may be configured to, after performing Bluetooth-based communication with an external electronic device, perform the UWB communication with the external electronic device based on a communication result.

With the miniaturization of electronic devices, electronic devices supporting wireless connections are widely used. The number of wireless electronic devices carried by users is increasing. For example, instead of wired earphones, wirelessly connected earbuds may be used. In addition, unlike conventional watches, an electronic device such as a smart watch may support a wireless connection with other electronic devices (e.g., a mobile phone) of a user. Furthermore, the number of electronic devices supporting wireless connection positioned within a limited space, such as a printer and a camera supporting wireless connection, is increasing.

For the activation of Bluetooth-based UWB communication, if there are many electronic devices supporting Bluetooth connection nearby, an electronic device may have to attempt the UWB communication with all of the nearby electronic devices. For example, the electronic device may attempt UWB ranging after Bluetooth connection with the nearby electronic devices. For UWB ranging, the electronic device may perform contention-based ranging. For example, the electronic device may perform UWB ranging by broadcasting a signal for ranging and receiving responses from nearby electronic devices within a specified time. In this case, collision may occur between responses as nearby electronic devices simultaneously transmit responses. In order to reduce collisions, a response waiting time of the electronic device may be increased, but the accuracy of UWB ranging may decrease as the response waiting time increases. Further, by performing ranging, power consumption of nearby electronic devices may increase.

SUMMARY

Various embodiments disclosed herein may provide an electronic device and a method for addressing the above-described problems.

According to an example embodiment of the disclosure, there is provided an electronic device including: a first communication circuit configured to support communication according to a Bluetooth protocol, a second communication circuit configured to support communication according to an ultra-wideband (UWB) protocol, at least one processor, and a memory. The memory stores instructions that, when executed by one or more of the at least one processor, configure the electronic device to: receive a first signal from a second external electronic device using the first communication circuit, transmit, to at least one first external electronic device, first quality information related to communication with the second external electronic device using the first communication circuit, receive, from the at least one first external electronic device, second quality information related to communication between the at least one first external electronic device and the second external electronic device using the first communication circuit, determine, based on the first quality information and the second quality information, a device to communicate with the second external electronic device based on the UWB protocol, from among the electronic device and the at least one first external electronic device; and communicate with the second external electronic device using the second communication circuit based on the determination.

According to an example embodiment of the disclosure, there is provided a method for ultra-wideband (UWB) communication of an electronic device, the method including: receiving a first signal from a second external electronic device based on a Bluetooth protocol, transmitting, to at least one first external electronic device, first quality information related to communication with the second external electronic device based on the Bluetooth protocol, receiving, from the at least one first external electronic device, second quality information related to communication between the at least one first external electronic device and the second external electronic device based on the Bluetooth protocol, and determining, based on the first quality information and the second quality information, a device to communicate with the second external electronic device based on the UWB protocol, from among the electronic device and the at least one first external electronic device.

According to an example embodiment of the disclosure, there is provided an electronic device including: a first communication circuit configured to support communication according to a Bluetooth protocol, a second communication circuit configured to support communication according to an ultra-wideband (UWB) protocol, at least one processor, and a memory. The memory stores instructions that, when executed by one or more of the at least one processor, configure the electronic device to: receive a first signal from a second external electronic device using the first communication circuit, determine whether to share a first reception quality of the first signal with at least one first external electronic device, transmit the first reception quality to the at least one first external electronic device using the first communication circuit, based on determination of sharing of the first reception quality, receive, from the at least one first external electronic device, second quality information related to communication between the at least one first external electronic device and the second external electronic device using the first communication circuit, determine, based on the first quality information and the second quality information, a device to communicate with the second external electronic device based on a UWB protocol, from among the electronic device and the at least one first external electronic device, and communicate with the second external electronic device using the second communication circuit based on the determination.

An electronic device according to various example embodiments disclosed herein may perform a response exclusively through communication quality sharing.

The electronic device according to various example embodiments disclosed herein may reduce power consumption through the exclusive response.

The electronic device according to various example embodiments disclosed herein may prevent and/or reduce collision between a plurality of electronic devices through the exclusive response.

Besides, various effects may be provided that are directly or indirectly identified through the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With respect to the description of the drawings, the same or similar reference signs may be used for the same or similar elements.

DETAILED DESCRIPTION

Hereinafter, various example embodiments of the disclosure will be described with reference to the accompanying drawings. However, this is not intended to limit the disclosure to the example embodiments, and it is to be understood to include various modifications, equivalents, and/or alternatives of the various example embodiments of the disclosure.

Figure 1:
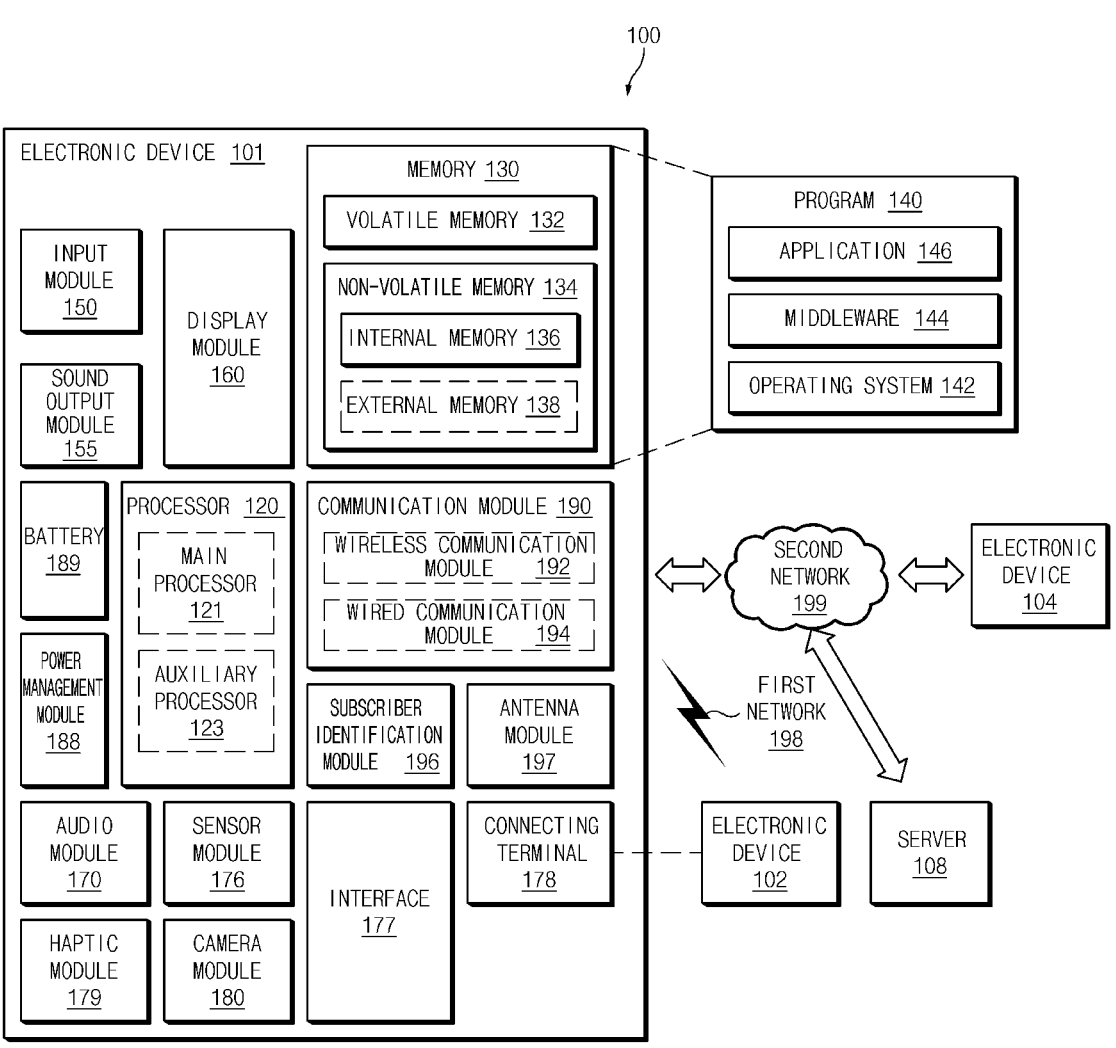
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC).

The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
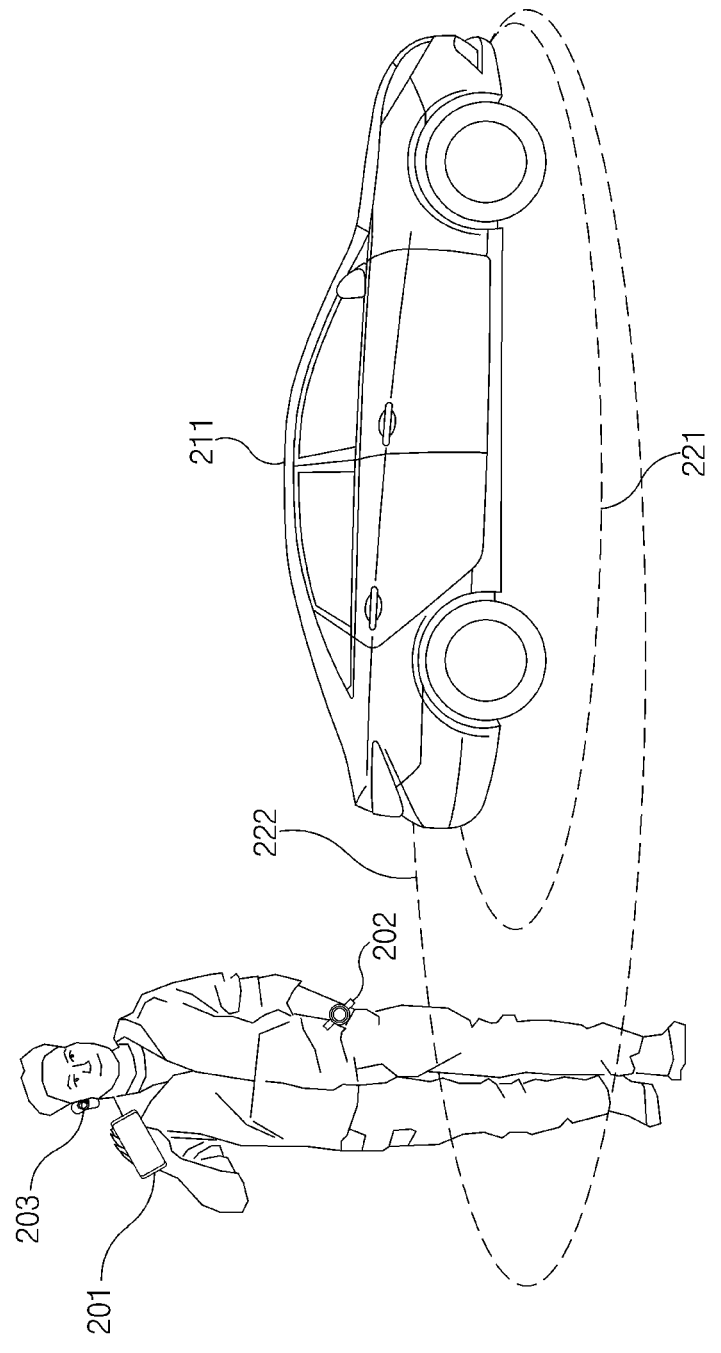
FIG. 2 is a diagram illustrating an example UWB communication environment according to various embodiments.

FIG. 2 is a diagram illustrating an example UWB communication environment according to various embodiments.

In an example of FIG. 2, a user may carry a first electronic device 201, a second electronic device 202, and a third electronic device 203. In FIG. 2, the first electronic device 201, the second electronic device 202, and the third electronic device 203 are illustrated as a mobile phone, a smart watch, and an earbud respectively, but the embodiments of the disclosure are not limited thereto. For example, each of the first electronic device 201, the second electronic device 202, and the third electronic device 203 may be any electronic device that supports UWB communication and Bluetooth communication (e.g., Bluetooth legacy and/or BLE).

An external electronic device 211 may be, for example, a vehicle owned by the user. In FIG. 2, although the external electronic device 211 is illustrated as a vehicle, embodiments of the disclosure are not limited thereto. For example, the external electronic device 211 may be any electronic device (e.g., a door lock device, a point-of-sale (POS) terminal, or a beacon) that supports a UWB-based application (e.g., keyless entry, payment, or positioning).

According to an embodiment, the external electronic device 211 may perform UWB and/or Bluetooth-based communication with another electronic device that has entered a second coverage 222. For example, the external electronic device 211 may perform a Bluetooth communication with another electronic device positioned within the second coverage 222 and perform UWB ranging with the other electronic device through Bluetooth communication. As a result of UWB ranging, if it is confirmed that another electronic device is positioned within the first coverage 221, the external electronic device 211 may perform an operation according to a UWB-based application. For example, the external electronic device 211 may unlock a door of the vehicle. In an example, the external electronic device 211 may perform separate authentication for the user and then unlock the door of the vehicle if the authentication is successful.

Hereinafter, with reference to FIG. 3, operations for UWB ranging between the external electronic device 211 and the first electronic device 201 may be described. For convenience of description, the first electronic device 201 is described, but the second electronic device 202 and the third electronic device 203 may also perform UWB ranging with the external electronic device 211 in the same manner.

Figure 3:
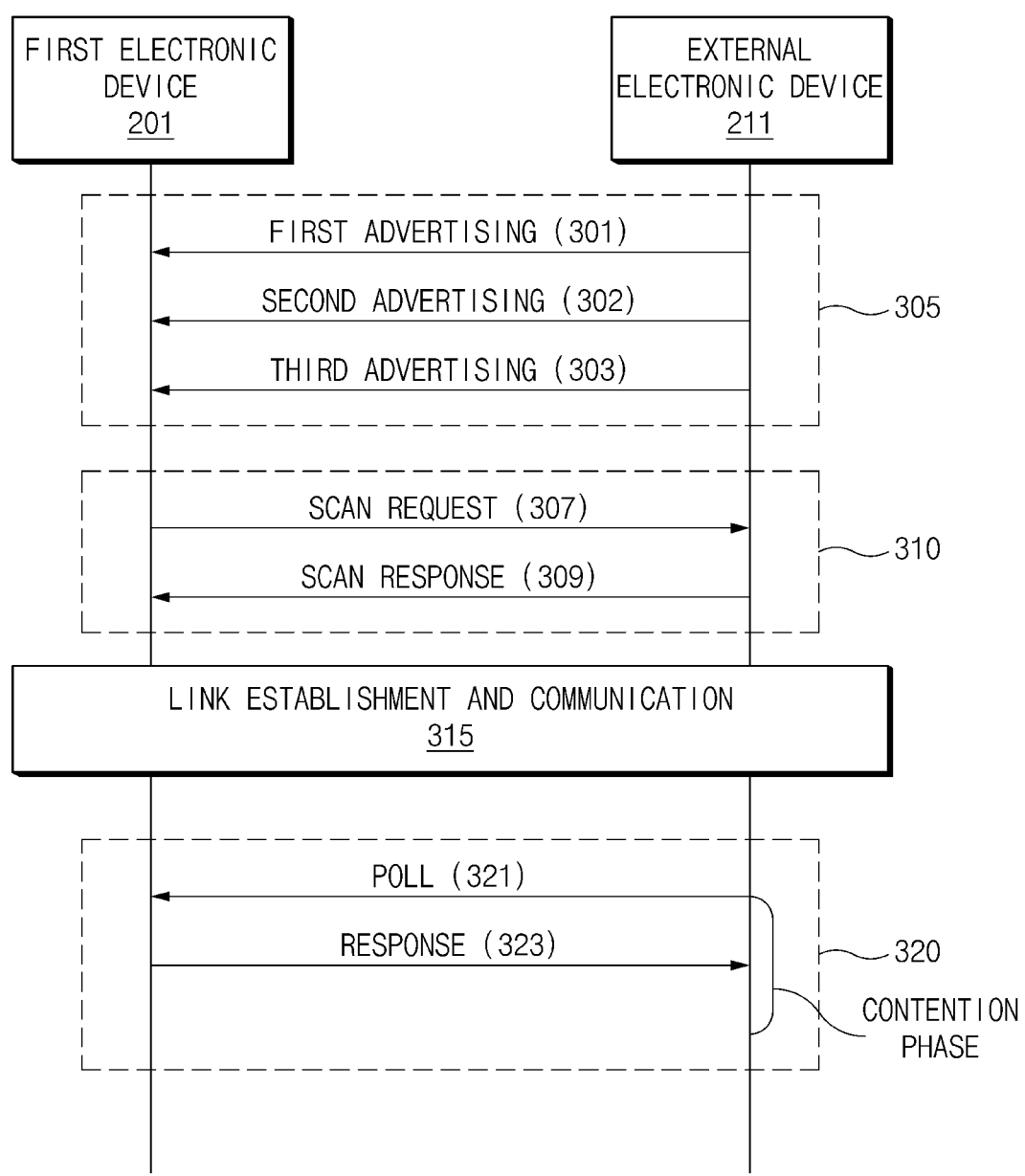
FIG. 3 is a signal flow diagram illustrating an example of UWB ranging according to various embodiments.

FIG. 3 is a signal flow diagram illustrating example UWB ranging according to various embodiments.

According to an embodiment, in operation 305, the external electronic device 211 may transmit an advertising signal. For example, the external electronic device 211 may transmit advertising signals based on a Bluetooth protocol (e.g., Bluetooth legacy and/or BLE). The external electronic device 211 may transmit a first advertising signal 301, a second advertising signal 302, and a third advertising signal 303. In an example, each of the first advertising signal 301, the second advertising signal 302, and the third advertising signal 303 may include an advertising packet including information (e.g., identifier and/or Bluetooth address information) about the external electronic device 211. The advertising packet may be multicast or broadcast. Each of the first advertising signal 301, the second advertising signal 302, and the third advertising signal 303 may be transmitted through different channels (e.g., any one of Bluetooth channels 37, 38, or 39). The external electronic device 211 may search for nearby devices by periodically performing advertising (e.g., operation 305). In FIG. 3, the advertising signal is shown as being transmitted three times, but the embodiments of the disclosure are not limited thereto.

For example, the first electronic device 201 may be configured to periodically perform a Bluetooth scan. For example, the first electronic device 201 may periodically monitor reception of a Bluetooth signal using a receive path of a Bluetooth communication circuit. In the example of FIG. 3, the first electronic device 201 may receive the first advertising 301.

In operation 310, the first electronic device 201 may perform the Bluetooth scan. For example, the first electronic device 201 may transmit a scan request 307 to the external electronic device 211 in response to the first advertising 301. The scan request 307 may include information (e.g., identification information and Bluetooth address information) about the first electronic device 201. The external electronic device 211 may transmit a scan response 309 to the first electronic device 201 in response to receiving the scan request 307.

In operation 315, the first electronic device 201 and the external electronic device 211 may establish a link and communicate with each other. For example, the external electronic device 211 may transmit a connection request (e.g., a low energy (LE) connection request) to the first electronic device 201 and the first electronic device 201 may respond to the connection request, thereby establishing a link between the first electronic device 201 and the external electronic device 211. After establishing the link, the first electronic device 201 and the external electronic device 211 may communicate. For example, the external electronic device 211 may initiate UWB ranging with the first electronic device 201 by transmitting a signal indicating the UWB ranging through the established link. In an example, the external electronic device 211 checks whether the first electronic device 201 supports UWB ranging through the established link, and if the first electronic device 201 is able to perform the UWB ranging, the external electronic device may transmit a signal requesting the UWB ranging. Upon receiving the signal requesting the UWB ranging, the first electronic device 201 may activate a communication module for UWB communication.

According to an embodiment, operation 315 may be omitted. The external electronic device 211 may perform UWB ranging (e.g., operation 320) immediately after the scan with the first electronic device 201 (operation 310). For example, for a UWB application for file sharing, UWB ranging may be attempted after confirming the existence of a nearby device (e.g., the first electronic device 201) through the Bluetooth scan. In this case, the external device 211 may transmit information indicating the start of UWB ranging (e.g., operation 320) to the first electronic device 201 through the scan response 309.

According to an embodiment, for a UWB application requiring security (e.g., keyless entry, or the like), the external device 211 may share necessary information by performing operation 315. For example, the external electronic device 211 may perform UWB ranging after exchanging important information such as security ranging measurement and/or a unique identifier through the established link.

In operation 320, the first electronic device 201 and the external electronic device 211 may perform UWB ranging. For example, the external electronic device 211 may transmit a poll 321. The external electronic device 211 may transmit (e.g., broadcast) the poll 321 at a designated period. The poll 321 may include a contention phase length value (e.g., the number of unit slots). After transmitting the poll 321, the external electronic device 211 may activate a receive path and attempt to receive a response signal for the contention phase length. Upon receiving the poll 321, the first electronic device 201 may transmit a response 323 (e.g., a UWB frame) to the poll 321. For example, the first electronic device 201 may transmit (e.g., unicast) the response 323 at any point in time within the contention phase length value indicated by the poll 321. For example, the response 323 may include positioning information (e.g., an angle of arrival), reception time information, a signal-to-noise ratio (SNR), and/or response time information.

According to an embodiment, the external electronic device 211 may measure a distance between the external electronic device 211 and the first electronic device 201 using round trip time (RTT) and response time information based on the poll 321 and the response 323. The UWB application of the external electronic device 211 may be configured to perform an operation (e.g., keyless entry) based on the measured distance.

In operation 320, for example, the external electronic device 211 and the first electronic device 201 may perform single sided two way ranging (SS-TWR). In this case, the external electronic device 211 may measure the distance between the external electronic device 211 and the first electronic device 201 based on the response 323 from the first electronic device 201. In operation 320, for another example, the external electronic device 211 and the first electronic device 201 may perform double sided two way ranging (DS-TWR). For example, after receiving the response 323, the external electronic device 211 may transmit a signal in response to the response 323 to the first electronic device 201. In this case, not only the external electronic device 211 but also the first electronic device 201 may measure the distance between the first electronic device 201 and the external electronic device 211.

In the example of FIG. 3, the first electronic device 201 is mainly described, but as illustrated in FIG. 2, other electronic devices may exist adjacently. In this case, as several electronic devices transmit responses to the poll, collisions between responses may occur. In order to reduce collisions, the contention phase length may be increased, but positioning accuracy decreases as the contention phase length increases.

According to an embodiment, only one electronic device among a plurality of electronic devices belonging to the same account (e.g., the first electronic device 201, the second electronic device 202, and/or the third electronic device 203) may exclusively respond to a poll signal of the external electronic device 211. A plurality of electronic devices may share information about an advertising signal received from the external electronic device 211 and determine one electronic device among the plurality of electronic devices as a device to transmit a response.

According to an embodiment, at least some of the operations of FIG. 3 may be omitted. For example, the first electronic device 201 and the external electronic device 211 may perform UWB ranging (e.g., operation 320) without establishing the link. For example, the first electronic device 201 and the external electronic device 211 may exchange information for UWB ranging through the scan (e.g., operation 310) and perform UWB ranging without establishing the link based on the scan.

In the following, various embodiments for an exclusive response may be described in greater detail below with reference to FIGS. 4 to 10.

Figure 4:
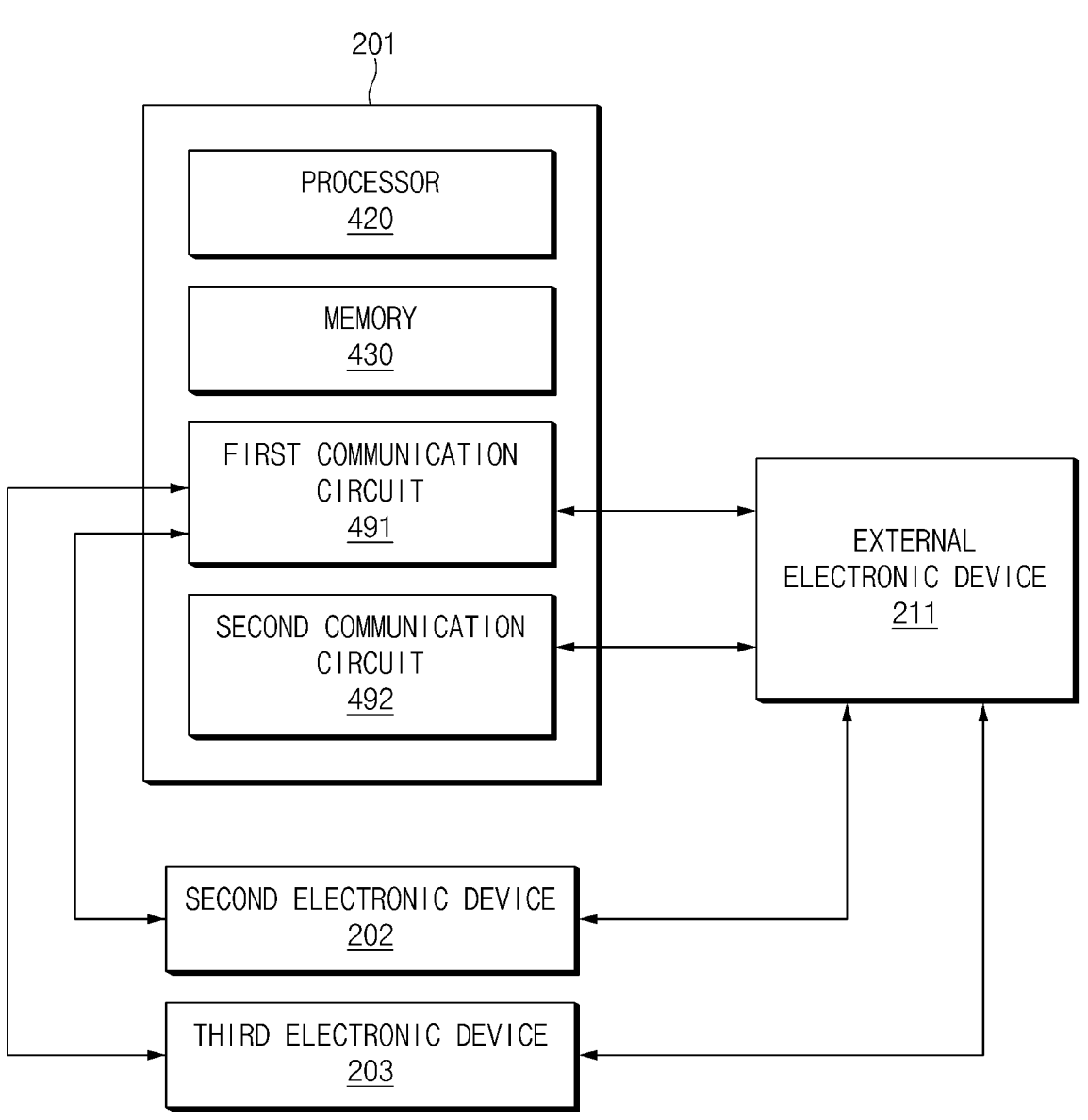
FIG. 4 is a block diagram illustrating an example configuration of a first electronic device according to various embodiments.

FIG. 4 is a block diagram illustrating an example configuration of a first electronic device according to various embodiments.

According to an embodiment, the first electronic device 201 may include a processor (e.g., at least one processor including various processing circuitry) 420 (e.g., the processor 120 of FIG. 1), a memory 430 (e.g., the memory 130 of FIG. 1), a first communication circuit 491 (e.g., the communication module 190 of FIG. 1), and/or a second communication circuit 492 (e.g., the communication module 190 of FIG. 1).

The processor 420 may be operatively connected to the memory 430, the first communication circuit 491, and the second communication circuit 492. The memory 430 may store instructions that cause the processor 420 to perform various operations of the first electronic device 201.

The processor 420 may include various processing circuitry (as used herein, including the claims, the term "processor" may include various processing circuitry, including at least one processor, wherein one or more processors of the at least one processor may be configured to perform the various functions described herein) and communicate with other electronic devices based on the Bluetooth protocol using the first communication circuit 491. For example, the first communication circuit 491 may correspond to a communication module configured to support Bluetooth communication (e.g., Bluetooth legacy and/or BLE). The first electronic device 201 may communicate with the second electronic device 202, the third electronic device 203, and/or the external electronic device 211 using the first communication circuit 491.

The processor 420 may communicate with other electronic devices based on a UWB communication protocol using the second communication circuit 492. For example, the second communication circuit 492 may correspond to a communication module configured to support UWB communication. The first electronic device 201 may communicate with the external electronic device 211 using the second communication circuit 492.

The configuration of the first electronic device 201 illustrated in FIG. 4 is merely an example, and embodiments of the disclosure are not limited thereto. For example, the first electronic device 201 may further include a component not illustrated in FIG. 4. The first electronic device 201 may further include, for example, at least a part of the configuration of the electronic device 101 of FIG. 1. The second electronic device 202, the third electronic device 203, and the external electronic device 211 may have components similar to those of the first electronic device 201.

For example, the first electronic device 201, the second electronic device 202, and the third electronic device 203 may be electronic devices owned by the same user. For another example, the first electronic device 201, the second electronic device 202, and the third electronic device 203 may be electronic devices belonging to the same group or to the same account. For yet another example, the first electronic device 201, the second electronic device 202, and the third electronic device 203 may be devices connected to the same device or devices connected to the same access point (AP) (e.g., mobile hotspot).

According to an embodiment, the first electronic device 201 may be configured to perform a BLE scan for a UWB ranging operation. The memory 430 of the first electronic device 201 may store a UWB application. For example, the UWB application may be installed in the first electronic device 201 by a manufacturer or installed in the first electronic device 201 by a user. The UWB application may perform the BLE scan for UWB ranging at an arbitrary or specified point in time. For example, the processor 420 may perform the BLE scan using the first communication circuit 491 in response to a request of the UWB application.

The UWB application may set a scan parameter in the first electronic device 201. For example, the scan parameter may be set by a manufacturer or by a user. The scan parameter may include, for example, information on a duty cycle (e.g., an activation time period and length of the first communication circuit 491) of the BLE scan for UWB communication. The processor 420 may perform the BLE scan by controlling the first communication circuit 491 according to the scan parameter. The BLE scan duty cycle may be set to 10% (e.g., full period 5000 ms, scan interval length 500 ms). In this case, the processor 420 may monitor a first channel (e.g., channel 37) for 500 ms from the starting point in time of the BLE scan, and then stop the BLE scan for 4500 ms. The processor 420 may monitor a second channel (e.g., channel 38) for the following 500 ms and stop the BLE scan for 4500 ms. Then, the processor 420 may monitor a third channel (e.g., channel 39) for the following 500 ms and stop the BLE scan for 4500 ms. For example, the processor 420 may repeatedly perform the BLE scan as described above until the Bluetooth function is deactivated, until stop of the BLE scan is requested by the UWB application, or until scan is stopped based on the Bluetooth protocol.

In an example, when the BLE scan for UWB ranging is performed, the processor 420 may transmit only information about an electronic device that satisfies a specified condition among other discovered electronic devices to the UWB application. For example, the electronic device that satisfies a specified condition may be an electronic device in which a UWB application is installed. For another example, the electronic device that satisfies a specified condition may be an electronic device corresponding to an identifier of another electronic device stored in the memory 430.

The first electronic device 201 may communicate with the second electronic device 202 and the third electronic device 203 using the first communication circuit 491. The first electronic device 201 may establish a first link with the second electronic device 202 using the first communication circuit 491 and communicate with the second electronic device 202 through the first link. The first electronic device 201 may establish a second link with the second electronic device 202 and communicate with the third electronic device 203 through the second link.

In the following, communication of the first electronic device 201 with the second electronic device 202 and the third electronic device 203 may be described in greater detail below with reference to FIG. 5.

Figure 5:
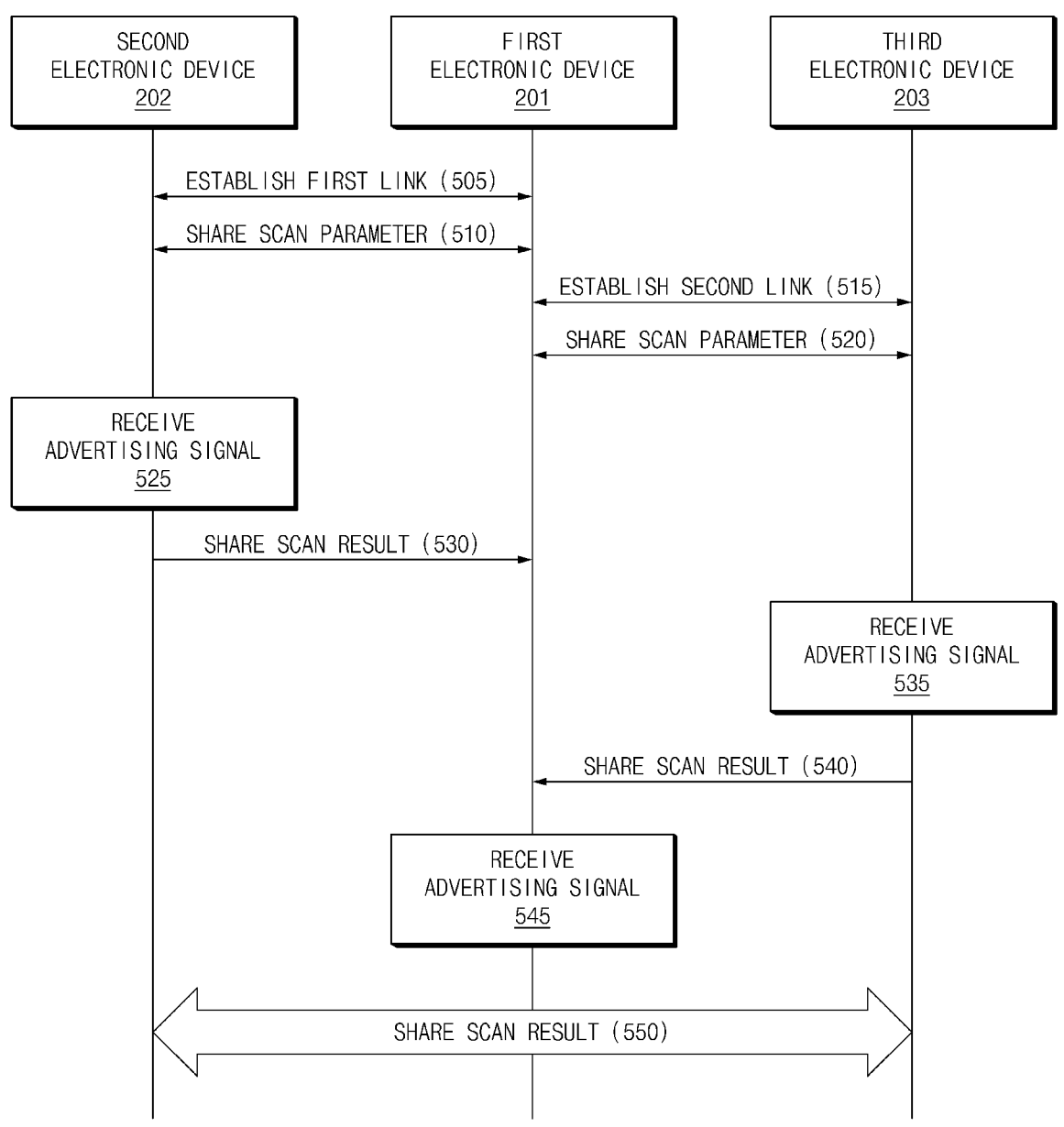
FIG. 5 is a signal flow diagram illustrating an example of scan result sharing according to various embodiments.

FIG. 5 is a signal flow diagram illustrating example scan result sharing according to various embodiments.

Referring to FIGS. 4 and 5, in operation 505, the first electronic device 201 and the second electronic device 202 may establish a first link (505). For example, the first electronic device 201 may periodically perform a scan (e.g., the BLE scan) using the first communication circuit 491. For example, the first electronic device 201 may monitor advertising signals from other electronic devices by activating a receive path of the first communication circuit for a specified period (e.g., scan window) according to a specified period (e.g., scan interval). For example, the first electronic device 201 may be configured to monitor one channel (e.g., an advertising channel) in one interval. The second electronic device 202 and the third electronic device 203 may also be configured to perform a scan in a similar manner.

For example, the second electronic device 202 may transmit an advertising signal in a multicast or broadcast manner. The second electronic device 202 may transmit the advertising signal based on at least one of power supply, a specified time period, and/or a user input regarding the second electronic device 202.

The advertising signal may include information for connection with a nearby electronic device and/or information about an account (e.g., a paired electronic device). For example, the advertising signal may include at least one of identification information about the second electronic device 202, user account information, information indicating whether the second electronic device 202 is currently paired with another device, information about at least one previously paired device, information about devices that may be paired at the same time, transmission power, a detection region, and/or information about remaining battery capacity of the second electronic device 202.

The first electronic device 201 may connect with the second electronic device 202 based on receiving the advertising signal from the second electronic device 202. For example, the first electronic device 201 may output a user interface including information about the second electronic device 202 and connect with the second electronic device 202 based on a user input to the user interface. An example user interface may be described below with reference to FIG. 6. Although it has been described that the first link is established based on BLE, the embodiments of the disclosure are not limited thereto. For example, the first electronic device 201 and the second electronic device 202 may establish the first link based on Bluetooth legacy.

In operation 510, the first electronic device 201 and the second electronic device 202 may share a scan parameter. For example, the first electronic device 201 and the second electronic device 202 may check whether the BLE scan for UWB communication is set by sharing a scan parameter through the first link. For another example, the first electronic device 201 and the second electronic device 202 may exchange information indicating whether the UWB application is installed. In the example of FIG. 5, it may be assumed that the BLE scan for UWB communication is set for the first electronic device 201 and the second electronic device 202. Sharing of the scan parameter may be performed at any point in time after establishment of the first link. For example, the first electronic device 201 may share the scan parameter when the first link is established or when the BLE scan is triggered by the UWB application.

According to an embodiment, the first electronic device 201 and the second electronic device 202 may determine a time interval (hereinafter, a comparison time interval) for comparing scan results through sharing of the scan parameter. For example, the first electronic device 201 and the second electronic device 202 may negotiate the comparison time interval based on sharing of the scan parameter. Times at which the first electronic device 201 and the second electronic device 202 receive advertising signals through the BLE scan for UWB communication may be different. Accordingly, by comparing scan results received during the comparison time interval, a device to perform UWB communication may be determined within the comparison time interval. For example, the comparison time interval may be set by the number of scan intervals, the number of scan windows, or a specified time value. In an example, the comparison time interval may be set according to the number of other electronic devices that is to share scan results with. The first electronic device 201 and the second electronic device 202 may be configured to have the same comparison time interval or different comparison time intervals. The comparison time interval may be defined as, for example, a predetermined time interval after receiving the advertising signal. The comparison time interval may be defined by the UWB application or a Bluetooth controller.

In operation 515, the first electronic device 201 and the third electronic device 203 may establish a second link. For example, in a manner similar to operation 505, the first electronic device 201 may establish the second link with the third electronic device 203 using the first communication circuit 491.

In operation 520, the first electronic device 201 and the third electronic device 203 may share the scan parameter through the second link. The first electronic device 201 and the third electronic device 203 may share the scan parameter in a manner similar to operation 510. It may be assumed that the BLE scan for UWB communication is set for the first electronic device 201 and the third electronic device 203.

In operation 525, the second electronic device 202 may receive an advertising signal from the external electronic device 211. For example, the second electronic device 202 may perform the BLE scan by the UWB application. Through the BLE scan, the second electronic device 202 may receive an advertising signal including an advertising packet from the external electronic device 211.

In operation 530, the second electronic device 202 may share a scan result with the first electronic device 201 through the first link. The scan result may include, for example, information on reception strength of the received advertising signal and Bluetooth address information about the external electronic device 211. The scan result may further include reception sensitivity, a PHY type of the advertising packet, an advertising packet type, an event type indicating a scan response, reception channel information, advertiser transmission power, a manufacturer identifier, and first link clock information upon reception of the advertising packet, and the like. In an example, the first electronic device 201 may share the scan result received from the second electronic device 202 with the third electronic device 203. When the second electronic device 202 and the third electronic device 203 have a separate link, the second electronic device 202 may share the scan result with the third electronic device 203.

In operation 535, the third electronic device 203 may receive an advertising signal from the external electronic device 211. For example, the third electronic device 203 may perform the BLE scan by the UWB application. Through the BLE scan, the third electronic device 203 may receive an advertising signal including an advertising packet from the external electronic device 211.

In operation 540, the third electronic device 203 may share a scan result with the first electronic device 201. The third electronic device 203 may transmit the scan result to the first electronic device 201 through the second link. In an example, the first electronic device 201 may share the scan result received from the third electronic device 203 with the second electronic device 202. When the second electronic device 202 and the third electronic device 203 have a separate link, the third electronic device 203 may share the scan result with the second electronic device 202.

In operation 545, the first electronic device 201 may receive an advertising signal from the external electronic device 211. For example, the first electronic device 201 may perform the BLE scan by the UWB application. Through the BLE scan, the first electronic device 201 may receive an advertising signal including an advertising packet from the external electronic device 211.

In operation 550, the first electronic device 201 may share the scan result with the second electronic device 202 and the third electronic device 203. The first electronic device 201 may transmit the scan result to the second electronic device 202 through the first link and transmit the scan result to the third electronic device 203 through the second link.

For example, the first electronic device 201 may collect the scan result of the first electronic device 201, the scan result of the second electronic device 202, and the scan result of the third electronic device 203, and transmit the collected results to the second electronic device 202 and the third electronic device 203. For another example, when the first electronic device 201 receives the scan result, the first electronic device 201 may share the scan result with other connected electronic devices.

According to an embodiment, each of the first electronic device 201, the second electronic device 202, and the third electronic device 203 may determine an electronic device to perform UWB communication by comparing the scan results. For example, the first electronic device 201 may determine the first electronic device 201 as the device to perform UWB communication when the advertising signal that the first electronic device 201 has received has better reception strength or sensitivity than those of the second electronic device 202 and the third electronic device 203. In this case, the second electronic device 202 and the third electronic device 203 may not perform UWB communication because the scan result of the first electronic device 201 are better than their own scan results.

For example, the first electronic device 201 may compare scan results received within the comparison time interval with the first electronic device's own scan result. The comparison time interval may be a predetermined time before reception of the advertising signal, a predetermined time including reception of the advertising signal, or a predetermined time after reception of the advertising signal. For example, the second electronic device 202 do not receive scan results from other electronic devices when the second electronic device 202 receives the advertising signal (operation 525). In this case, the second electronic device

202 may determine the device to perform UWB communication using scan results received during the comparison time interval after reception of the advertising signal. Upon reception of the advertising signal (e.g., operation 545), the first electronic device 201 may be in a state in which scan results have been acquired from all electronic devices (the second electronic device 202 and the third electronic device 203) that will share the scan results. In this case, the first electronic device 201 may determine the device to perform UWB communication using scan results received within the comparison time interval before reception of the advertising signal.

In FIG. 5, various operations are described based on sharing of scan results, but some operations may be omitted. For example, when there is no electronic device to share the scan result with, the first electronic device 201 may not share scan results and determine the device to perform UWB communication.

According to an embodiment, scan result sharing (e.g., operation 530 and/or operation 540) may be omitted. The first electronic device 201, the second electronic device 202, and the third electronic device 203 may be configured to share the scan results when reception strengths of advertising signals are greater than or equal to a threshold value. When the reception strength of the advertising signal of one electronic device (e.g., the first electronic device 201, the second electronic device 202, or the third electronic device 203) is less than the threshold value, the corresponding electronic device may not share the scan result. For example, when reception strength of the advertising signal of a specific electronic device is less than the threshold value, the specific electronic device may not perform UWB communication. For another example, when the reception strength of the advertising signal of a specific electronic device is less than the threshold value, the specific electronic device may not receive scan results from nearby electronic devices. This may refer, for example, to reception strengths of advertising signals of all nearby electronic devices including the specific electronic device being less than the threshold value. All nearby electronic devices including the specific electronic device may be configured to, when reception strengths of the all nearby electronic devices are less than the threshold value, attempt UWB communication.

In FIG. 5, it has been described that the scan results are shared by the first electronic device 201, the second electronic device 202, and the third electronic device 203, but the embodiments of the disclosure are not limited thereto. For example, the scan results may be transmitted to the first electronic device 201, the second electronic device 202, and the third electronic device 203 by the external electronic device 211. The external electronic device 211 may receive signals from the first electronic device 201, the second electronic device 202, and the third electronic device 203 through scanning, and identify reception strength of each received signal. The external electronic device 211 may transmit the identified reception strengths to the first electronic device 201, the second electronic device 202, and/or the third electronic device 203. Each of the first electronic device 201, the second electronic device 202, and the third electronic device 203 may determine the electronic device to perform UWB communication based on the reception strength received from the external electronic device 211.

Figure 6:
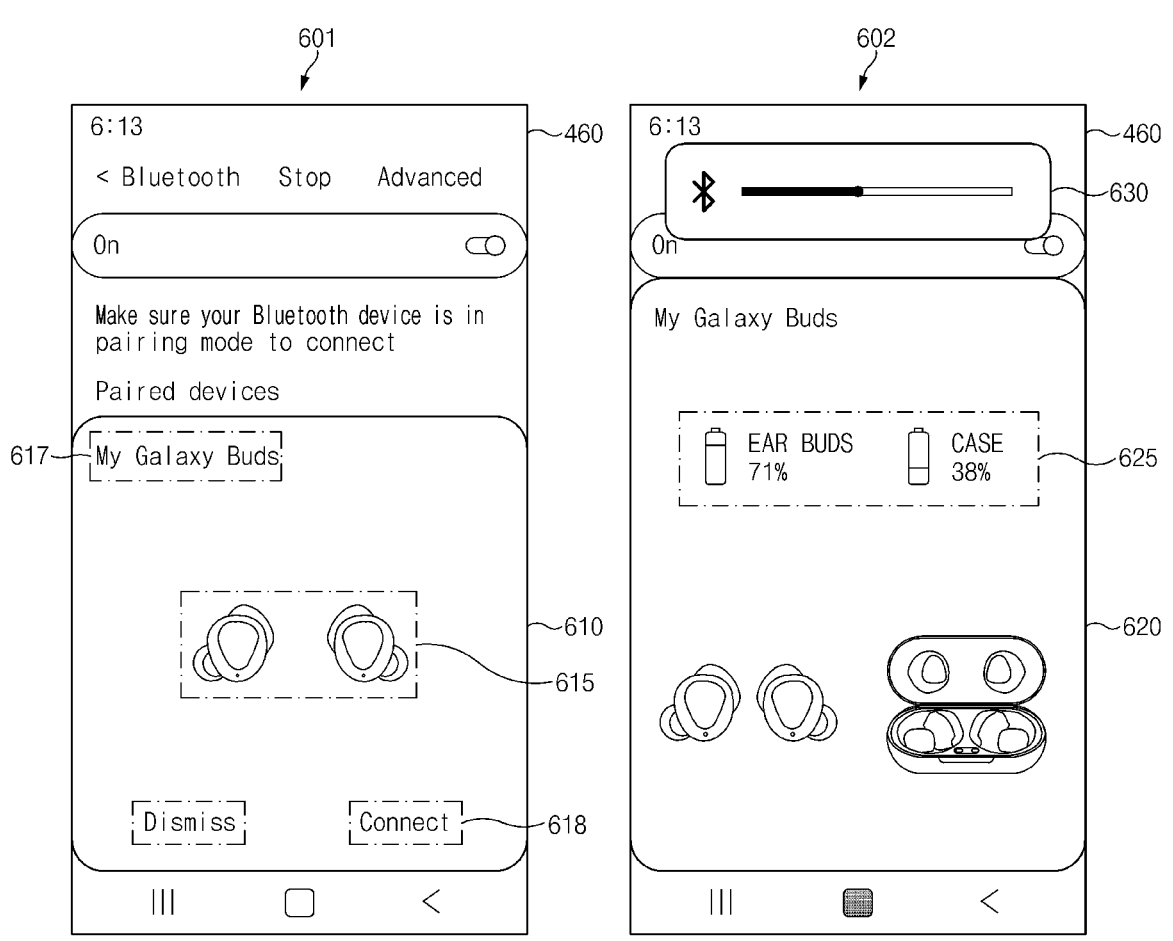
FIG. 6 is a diagram illustrating example user interfaces (UI) showing connections of devices in a Bluetooth network environment according to various embodiments.

FIG. 6 is a diagram illustrating example user interfaces (UI) showing connections of devices in a Bluetooth network environment according to various embodiments.

Referring to FIG. 6, at reference numeral 601, the first electronic device 201 may recognize the second electronic device 202 by receiving the advertising signal transmitted from the second electronic device 202, and may output, through a display 460 of the first electronic device 201, a first user interface 610 for informing the user of the recognized second electronic device 202.

For example, the first user interface 610 may include at least one of an image 615 representing the shape of the second electronic device 202 or a text 617 indicating a device name (e.g., My Galaxy Buds) of the second electronic device 202. For another example, although not illustrated in FIG. 6, the first user interface 610 may include information indicating whether or not the second electronic device 202 has a history of previous connections.

According to an embodiment, the first electronic device 201 may establish (e.g., operation 505 of FIG. 5) the first link with the second electronic device 202, in response to receiving a user input to a connecting UI 618 for requesting connection to the second electronic device 202 or automatically without the user input.

Once the first link is established, as in reference numeral 602, the first electronic device 201 may output, through the display 460, a second user interface 620 indicating that the second electronic device 202 is connected to the first electronic device 201. The second user interface 620 may further include, for example, an image 625 indicating a battery state of the second electronic device 202. The second user interface 520 may include volume information 630 related to the second electronic device 202. The second user interface 620 illustrated in FIG. 6 is simply an example, and embodiments of the disclosure are not limited thereto. For example, although a case is illustrated in the second user interface 620, the second electronic device 202 may not include the case, or the case of the second electronic device 202 may not be illustrated in the second user interface 620. For another example, the volume information 630 may be omitted.

Figure 7:
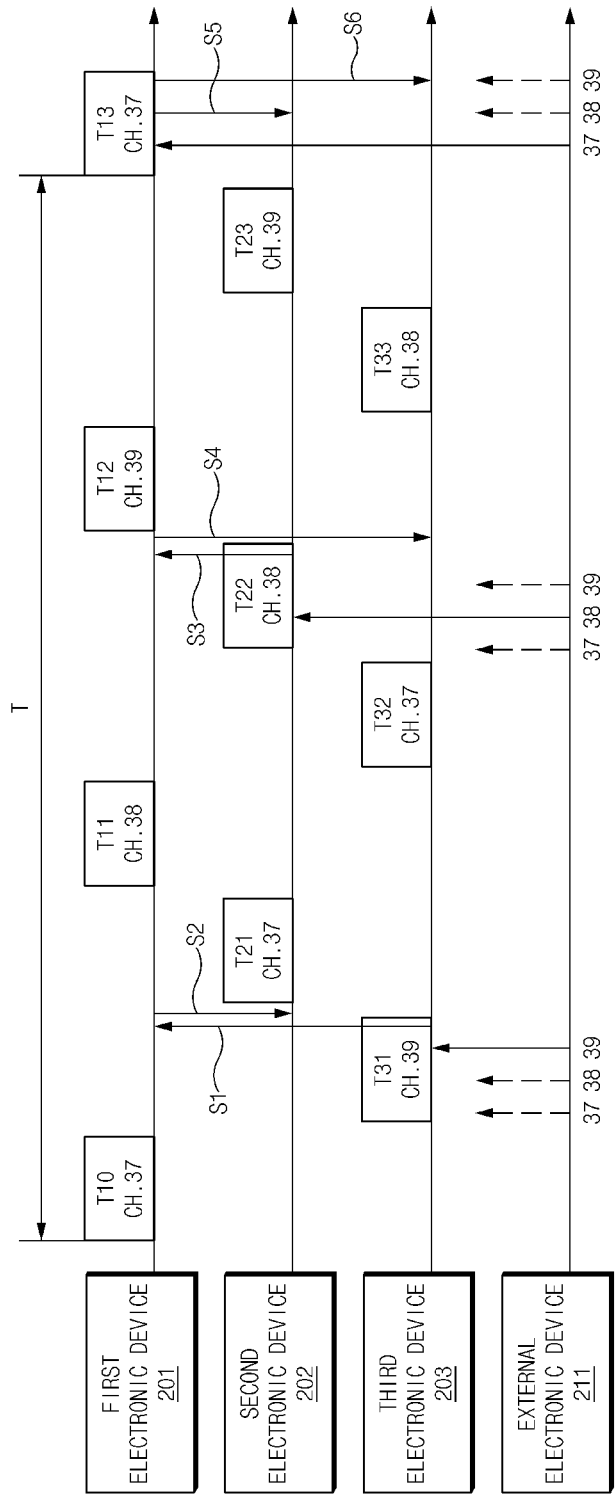
FIG. 7 is a diagram illustrating scan result sharing between electronic devices according to various embodiments.

FIG. 7 is a diagram illustrating scan result sharing between electronic devices according to various embodiments.

Referring to FIG. 7, each of the first electronic device 201, the second electronic device 202, and the third electronic device 203 may perform a periodic BLE scan. For example, each of the first electronic device 201, the second electronic device 202, and the third electronic device 203 may perform the BLE scan based on a request from the UWB application. The first electronic device 201 may scan channel 37 in interval T10, channel 38 in interval T11, channel 39 in interval T12, and channel 37 in interval T13. The second electronic device 202 may scan channel 37 in interval T21, channel 38 in interval T22, and channel 39 in interval T23. The third electronic device 203 may scan channel 39 in interval T31, channel 37 in interval T32, and channel 38 in interval T33.

In interval T31, the third electronic device 203 may perform the BLE scan on channel 39 and receive an advertising signal transmitted through channel 39 from the external electronic device 211. In response to receiving the advertising signal, the third electronic device 203 may transmit a first signal S1 including a scan result to the first electronic device 201. The first electronic device 201 may transmit a second signal S2 including the scan result received from the third electronic device 203 to the second electronic device 202 sharing the scan parameter. For example, the first electronic device 201 may transmit the scan result of the third electronic device 203 through the first link.

In interval T22, the second electronic device 202 may perform the BLE scan on channel 38 and receive an advertising signal transmitted through channel 38 from the external electronic device 211. In response to receiving the advertising signal, the second electronic device 202 may transmit a third signal S3 including a scan result to the first electronic device 201. The first electronic device 201 may transmit a fourth signal S4 including the scan result received from the second electronic device 202 to the third electronic device 203 sharing the scan parameter. For example, the first electronic device 201 may transmit the scan result of the second electronic device 202 through the second link.

In interval T13, the first electronic device 201 may perform the BLE scan on channel 37 and receive an advertising signal transmitted through channel 37 from the external electronic device 211. In response to receiving the advertising signal, the first electronic device 201 may transmit a fifth signal S5 including the scan result to the second electronic device 202 through the first link, and may transmit a sixth signal S6 including the scan result to the third electronic device 203 through the second link.

According to an embodiment, the first electronic device 201 may determine an electronic device to perform UWB communication based on the scan result. For example, the first electronic device 201 may determine the electronic device to perform UWB communication by comparing the scan results received within the comparison time interval T with the scan result of the first electronic device 201. The first electronic device 201 may determine an electronic device having the best communication quality among electronic devices sharing the scan parameter (e.g., the first electronic device 201, the second electronic device 202, and the third electronic device 203) as the electronic device to perform UWB communication. For example, when the communication quality of the first electronic device 201 is the best, the first electronic device 201 may perform the UWB communication (e.g., operation 320 of FIG. 3) with the external electronic device 211.

In an example, communication quality of the second electronic device 202 may be improved during the UWB communication between the first electronic device 201 and the external electronic device 211. For example, as the second electronic device 202 moves closer to the external electronic device 211, the reception strength of the advertising signal may be increased. In this case, the second electronic device 202 may compare the reception strength of the received advertising signal with the previously shared scan results. When the reception strength of the second electronic device 202 is better than the previously received scan results of the first electronic device 201 and the third electronic device 203, the second electronic device 202 may also perform the UWB communication with the external electronic device 211.

In the example of FIG. 7, the comparison time interval T may be set to three scan intervals or three scan windows. For example, the comparison time interval T may be set according to the number of electronic devices sharing the scan results.

Figure 8:
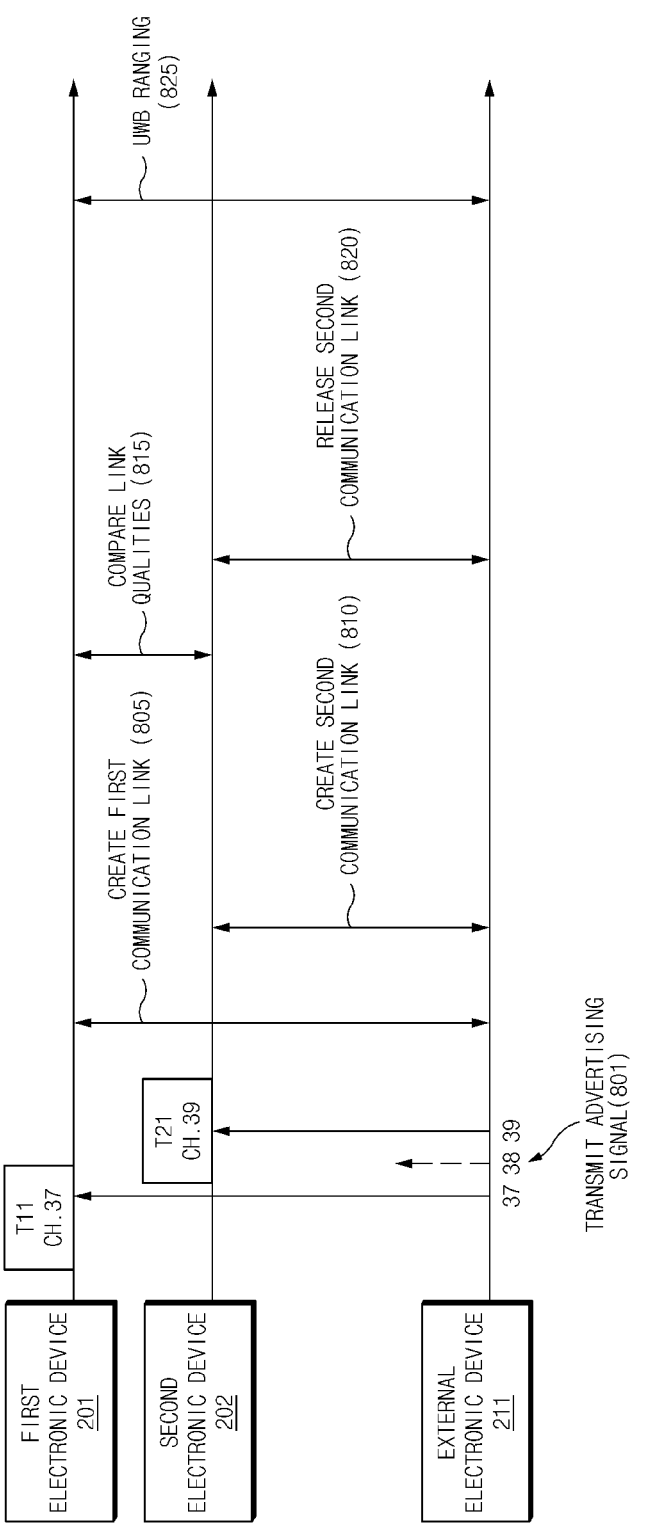
FIG. 8 is a diagram illustrating UWB ranging according to link quality according to various embodiments.

FIG. 8 is a diagram illustrating UWB ranging according to link quality according to various embodiments.

With reference to FIGS. 3 to 7, the determination of the UWB communication device according to sharing of scan results has been described. However, embodiments of the disclosure are not limited thereto. According to an embodiment, the first electronic device 201 may determine the device to perform UWB communication based on communication quality (e.g., the scan results and/or link quality).

Referring to FIG. 8, in operation 801, the external electronic device 211 may transmit an advertising signal. The first electronic device 201 may receive the advertising signal by scanning channel 37 in interval T11, and the second electronic device 202 may receive the advertising signal by scanning channel 39 in interval T21.

In operation 805, the first electronic device 201 may create a first communication link with the external electronic device 211. The first electronic device 201 may create the first communication link based on receiving the advertising signal. For example, the first electronic device 201 may exchange information (e.g., security information and/or authentication information) for UWB communication through the first communication link.

In operation 810, the second electronic device 202 may create a second communication link with the external electronic device 211. The second electronic device 202 may create the second communication link based on receiving the advertising signal. For example, the second electronic device 202 may exchange information (e.g., security information and/or authentication information) for UWB communication through the second communication link.

In operation 815, the first electronic device 201 and the second electronic device 202 may compare link qualities. The first electronic device 201 may transmit information about the quality of the first communication link to the second electronic device 202 through the first link. The second electronic device 202 may transmit information about the quality of the second communication link to the first electronic device 201 through the first link. In an example, the link quality of the first communication link may be better than that of the second communication link. In this case, in operation 820, the second electronic device 202 may release the second communication link. The second electronic device 202 may release the second communication link with the external electronic device 211, and may not perform any further operations for UWB communication.

In operation 825, the first electronic device 201 may perform UWB ranging with the external electronic device 211 (e.g., operation 320 of FIG. 3). The first electronic device 201 may exchange information for UWB ranging through the first communication link and activate a UWB module (e.g., the second communication circuit 492 of FIG. 4) of the first electronic device 201. In the example of FIG. 8, the first electronic device 201 may compare communication qualities more accurately than the scan result by comparing link qualities.

Figure 9:
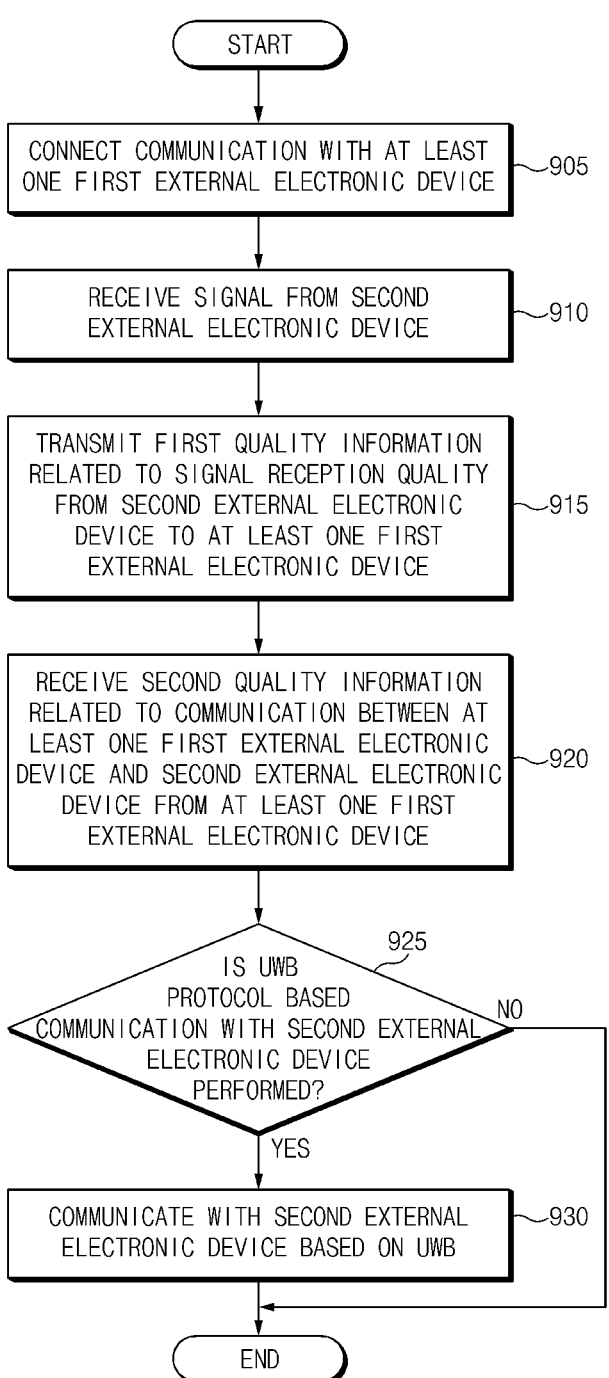
FIG. 9 is a flowchart illustrating an example UWB communication method for an electronic device according to various embodiments.

FIG. 9 is a flowchart illustrating an example UWB communication method for an electronic device according to various embodiments.

Referring to FIGS. 4 and 9, in operation 905, an electronic device (e.g., the first electronic device 201 of FIG. 4) may connect communication with at least one first external electronic device (e.g., the second electronic device 202 of FIG. 4 and/or the third electronic device 203). For example, the electronic device may connect communication with at least one first external electronic device using a first communication circuit (e.g., the first communication circuit 491 of FIG. 4). The first communication circuit may connect communication with at least one first external electronic device based on a Bluetooth protocol (e.g., Bluetooth legacy and/or BLE) (e.g., operations 505 and 515 of FIG. 5).

After communication is connected, the electronic device may identify whether the at least one first external electronic device supports a Bluetooth scan for UWB communication. For example, the electronic device may receive a scan parameter from the at least one first external electronic device at any point in time. The electronic device may identify whether the at least one first external electronic device is a device configured to perform the Bluetooth scan for UWB communication based on the scan parameter. In the example of FIG. 8, it may be assumed that the at least one first external electronic device is the device configured to perform the Bluetooth scan for UWB communication.

In operation 910, the electronic device may receive a signal (e.g., operation 545 of FIG. 5) from a second external electronic device (e.g., the external electronic device 211 of FIG. 2). The electronic device may receive an advertising signal from the second external electronic device using the first communication circuit. For example, the electronic device may receive a signal from the second external electronic device by performing a Bluetooth scan using the first communication circuit in response to a request of the UWB application.

In operation 915, the electronic device may transmit first quality information related to signal reception quality from the second external electronic device to at least one first external electronic device (e.g., operation 550 of FIG. 5). The first quality information may include reception quality (e.g., reception sensitivity and/or reception strength) of the signal received from the second external electronic device. The electronic device may transmit identification information (e.g., the identifier of the first external electronic device and/or the address of the first external electronic device) about the first external electronic device to at least one first external electronic device, together with the first quality information. For example, the electronic device may transmit the first quality information using the first communication circuit.

In operation 920, the electronic device may receive second quality information related to communication between the at least one first external electronic device and the second external electronic device from the at least one first external electronic device (e.g., operations 530 and 540 of FIG. 5). The second quality information may include reception quality (e.g., reception sensitivity and/or reception strength) of the signal received by the at least one first external electronic device from the second external electronic device. For example, the electronic device may receive the second quality information using the first communication circuit.

In operation 925, the electronic device may determine whether to perform UWB protocol based communication with the second external electronic device. The electronic device may compare the first quality information and the second quality information and determine a device to communicate with the second external electronic device from among the electronic device and the at least one first external electronic device. The electronic device may compare the first quality information with the second quality information and determine a device having the best quality as a device to communicate with the second external electronic device. When the electronic device is not determined as a device to communicate with the second external electronic device (e.g., NO in operation 925), the electronic device may not perform UWB communication.

When the electronic device is determined as the device to communicate with the second external electronic device (e.g., YES in operation 925), in operation 930, the electronic device may communicate with the second external electronic device based on UWB. The electronic device may activate a second communication circuit (e.g., the second communication circuit 492 of FIG. 4) and perform UWB ranging with the second external electronic device.

In an example, even if the electronic device performs UWB ranging, the at least one first external electronic device may also perform UWB ranging with the second external electronic device. For example, the communication quality of one first external electronic device among at least one first external electronic device may be improved. When the communication quality of one first external electronic device is superior to that of the electronic device, the corresponding first external electronic device may also perform UWB ranging with the second external electronic device.

In various embodiments of the disclosure, it is disclosed that the electronic device and one external electronic device perform ranging, but the embodiments of the disclosure are not limited thereto. The electronic device may perform ranging with a plurality of external electronic devices. For example, when an application of the electronic device requires high accuracy or high security, the electronic device may be configured to perform UWB ranging with a plurality of external electronic devices.

Figure 10:
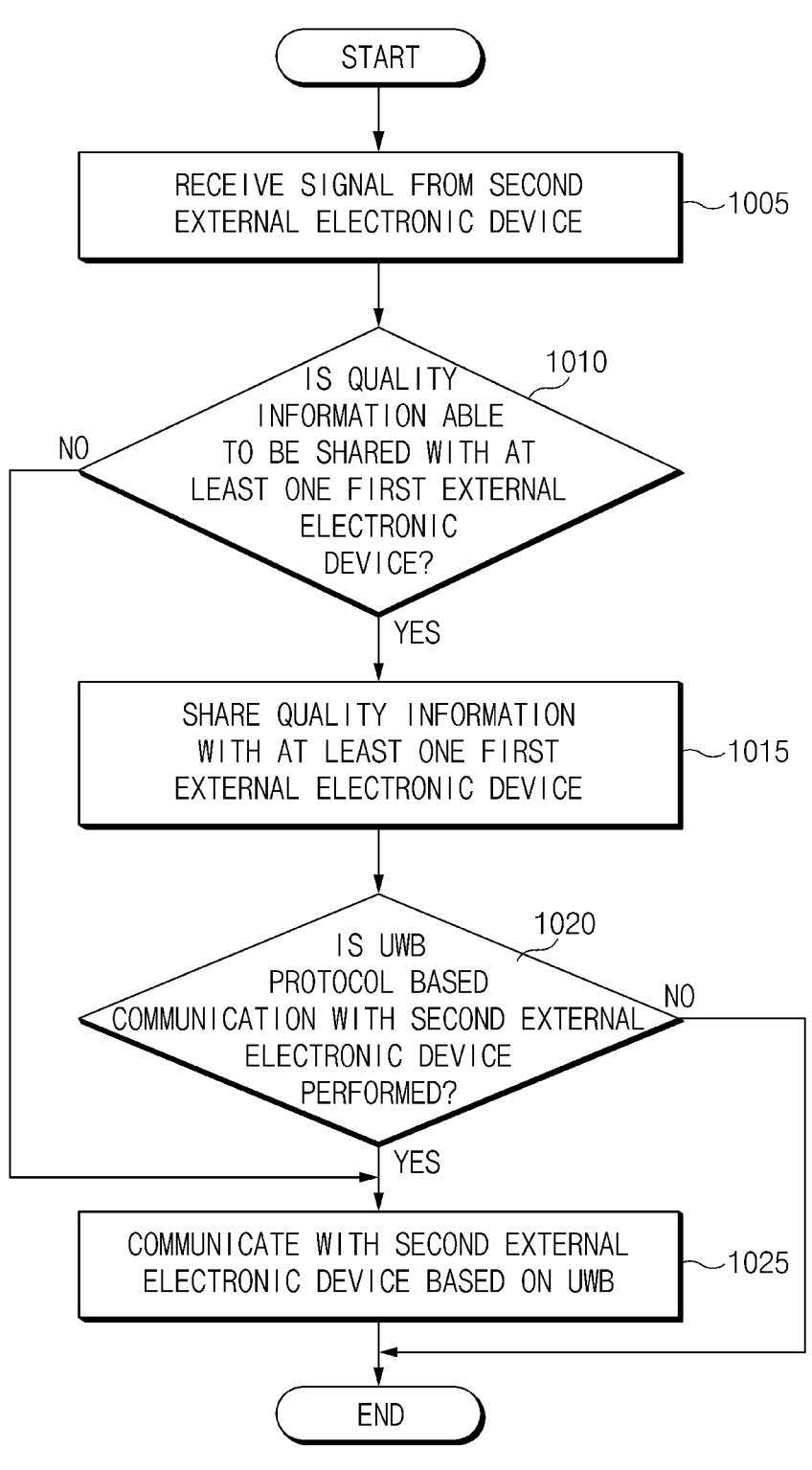
FIG. 10 is a flowchart illustrating an example UWB communication method for an electronic device according to various embodiments.

FIG. 10 is a flowchart illustrating an example UWB communication method for an electronic device according to various embodiments.

Referring to FIGS. 4 and 10, in operation 1005, an electronic device (e.g., the first electronic device 201 of FIG. 4) may receive a signal (e.g., operation 545 of FIG. 5) from a second external electronic device (e.g., the external electronic device 211 of FIG. 2). The electronic device may receive an advertising signal from the second external electronic device using a first communication circuit (e.g., the first communication circuit 491 of FIG. 4). For example, the electronic device may receive a signal from the second external electronic device by performing a Bluetooth scan using the first communication circuit in response to a request of the UWB application.

In operation 1010, the electronic device may determine whether quality information is able to be shared with at least one first external electronic device (e.g., the second electronic device 202 and/or the third electronic device 203 of FIG. 4). For example, if the electronic device is in a state of being connected to at least one first external electronic device based on Bluetooth, and the at least one connected first external electronic device is a device to perform the Bluetooth scan for UWB communication, the electronic device may determine that the at least one first external electronic device is in a sharing possible state. For example, the electronic device may identify whether the external electronic device is a device configured to perform the Bluetooth scan for UWB communication by receiving a scan parameter from the at least one first external electronic device at a point in time.

When sharing of quality information with the at least one first external electronic device is possible (e.g., YES in operation 1010), in operation 1015, the electronic device may share quality information with the at least one first external electronic device. For example, the electronic device may share quality information using the first communication circuit. The electronic device may share quality information by performing operations 915 and 920 of FIG. 9.

In operation 1020, the electronic device may determine whether to perform UWB protocol based communication with the second external electronic device. The electronic device may compare the shared quality information and determine a device to communicate with the second external electronic device from among the electronic device and the at least one first external electronic device. The electronic device may compare first quality information with second quality information and determine a device having the best quality as the device to communicate with the second external electronic device. When the electronic device is not determined as the device to communicate with the second external electronic device (e.g., NO in operation 1020), the electronic device may not perform UWB communication.

When the electronic device is determined as the device to communicate with the second external electronic device (e.g., YES in operation 1020), in operation 1025, the electronic device may communicate with the second external electronic device based on UWB. The electronic device may activate a second communication circuit (e.g., the second communication circuit 492 of FIG. 4) and perform UWB ranging with the second external electronic device.

When it is not possible to share quality information with the at least one first external electronic device (e.g., NO in operation 1010), the electronic device may communicate with the first external electronic device based on UWB (operation 1025) without sharing quality information.

In the disclosure, exclusive UWB ranging through sharing of quality information between the electronic device and at least one first external electronic device has been described. In an embodiment, the second external electronic device may share quality information. For example, the second external electronic device may generate quality information based on signals received from the electronic device and at least one first external electronic device and transmit the generated quality information to the electronic device and the at least one first external electronic device. For example, the second external electronic device may transmit a signal including communication quality to devices belonging to the same account (e.g., the electronic device and the at least one first external electronic device). The electronic device and the at least one first external electronic device may determine a device capable of performing UWB ranging with the second external electronic device based on the received signal.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first communication circuit configured to support communication according to a Bluetooth protocol;
a second communication circuit configured to support communication according to an ultra-wideband (UWB) protocol;
at least one processor; and
a memory, wherein the memory stores instructions that, when executed by one or more of the at least one processor, cause the electronic device to:
receive a first signal from a second external electronic device using the first communication circuit;
transmit, to at least one first external electronic device, first quality information related to communication with the second external electronic device using the first communication circuit;
receive, from the at least one first external electronic device, second quality information related to communication between the at least one first external electronic device and the second external electronic device using the first communication circuit;

determine, based on the first quality information and the second quality information, a device to communicate with the second external electronic device based on the UWB protocol, from among the electronic device and the at least one first external electronic device; and communicate with the second external electronic device using the second communication circuit based on the determination.

2. The electronic device of claim 1, wherein the instructions, when executed by one or more of the at least one processor, cause the electronic device to:

identify a device having a best communication quality using the first quality information and the second quality information; and determine the identified device as the device to communicate with the second external electronic device.

3. The electronic device of claim 2, wherein the instructions, when executed by one or more of the at least one processor, cause the electronic device to:

activate the second communication circuit and communicate with the second external electronic device based on the electronic device being determined as the device to communicate with the second external electronic device; and not communicate with the second external electronic device based on the at least one first external electronic device being determined as the device to communicate with the second external electronic device.

4. The electronic device of claim 2, wherein the communication quality includes at least one of reception sensitivity or reception strength of a signal received from the second external electronic device.

5. The electronic device of claim 1, wherein the instructions, when executed by one or more of the at least one processor, cause the electronic device to:

activate the first communication circuit for communication based on the UWB protocol; and receive the first signal by performing a Bluetooth scan using the first communication circuit.

6. The electronic device of claim 5, wherein the first signal includes an advertising signal.

7. The electronic device of claim 5, wherein the instructions, when executed by one or more of the at least one processor, cause the electronic device to:

receive a scan parameter from the at least one first external electronic device using the first communication circuit; and identify the at least one first external electronic device as a device for which communication quality sharing is set based on the scan parameter.

8. The electronic device of claim 1, wherein the electronic device and the at least one first external electronic device belong to the same account or the same group.

9. A method for ultra-wideband (UWB) communication of an electronic device, the method comprising:

receiving a first signal from a second external electronic device based on a Bluetooth protocol;

transmitting, to at least one first external electronic device, first quality information related to communication with the second external electronic device based on the Bluetooth protocol;

receiving, from the at least one first external electronic device, second quality information related to communication between the at least one first external electronic device and the second external electronic device based on the Bluetooth protocol; and determining, based on the first quality information and the second quality information, a device to communicate with the second external electronic device based on the UWB protocol, from among the electronic device and the at least one first external electronic device.

10. The method of claim 9, wherein the determining of the device to communicate with the second external electronic device includes:

identifying a device having a best communication quality using the first quality information and the second quality information; and determining the identified device as the device to communicate with the second external electronic device.

11. The method of claim 10, further comprising performing the UWB communication with the second external electronic device based on the electronic device being determined as the device to communicate with the second external electronic device.

12. The method of claim 10, wherein the communication quality includes at least one of reception sensitivity or reception strength of a signal received from the second external electronic device.

13. The method of claim 9, wherein the receiving of the first signal includes receiving the first signal by performing a Bluetooth scan.

14. The method of claim 13, wherein the first signal includes an advertising signal.

15. The method of claim 13, further comprising:

receiving a scan parameter from the at least one first external electronic device; and identifying the at least one first external electronic device as a device for which communication quality sharing is set based on the scan parameter.

16. An electronic device comprising:

a first communication circuit that supports communication according to a Bluetooth protocol;

a second communication circuit that supports communication according to an ultra-wideband (UWB) protocol;

a processor; and a memory, wherein the memory stores instructions that, when executed by the processor, cause the electronic device to:

receive a first signal from a second external electronic device using the first communication circuit;

determine whether to share a first reception quality of the first signal with at least one first external electronic device;

transmit the first reception quality to the at least one first external electronic device using the first communication circuit, based on determination of sharing of the first reception quality;

receive, from the at least one first external electronic device, second quality information related to communication between the at least one first external electronic device and the second external electronic device using the first communication circuit;

determine, based on the first quality information and the second quality information, a device to communicate with the second external electronic device based on the UWB protocol, from among the electronic device and the at least one first external electronic device; and communicate with the second external electronic device using the second communication circuit based on the determination.

17. The electronic device of claim 16, wherein the instructions, when executed by the processor, cause the electronic device to determine sharing of the first reception quality when the electronic device is in a state of being connected to the at least one first external electronic device and the at least one first external electronic device supports a Bluetooth scan for UWB communication.

18. The electronic device of claim 17, wherein the instructions, when executed by the processor, cause the electronic device to identify whether the at least one first external electronic device supports the Bluetooth scan for UWB communication by receiving a scan parameter from the at least one first external electronic device using the first communication circuit.

19. The electronic device of claim 16, wherein the instructions, when executed by the processor, cause the electronic device to:

activate the second communication circuit and communicate with the second external electronic device when the electronic device is determined as the device to communicate with the second external electronic device; and not to communicate with the second external electronic device when the at least one first external electronic device is determined as the device to communicate with the second external electronic device.

20. The electronic device of claim 16, wherein the instructions, when executed by the processor, cause the electronic device to communicate with the second external electronic device using the second communication circuit without transmitting the first reception quality when it is determined that the first reception quality is not shared.

\* \* \* \* \*